Dec. 19, 1961

J. F. SCOTT ET AL 3,013,751

COMBINATION AERODYNAMIC BRAKE AND THRUST
REVERSER FOR JET AIRCRAFT

Filed Dec. 1, 1959

INVENTORS
JOHN F. SCOTT
JAMES L. KING
ZOLTAN PAZMANY

By Knox & Knox

Dec. 19, 1961   J. F. SCOTT ET AL   3,013,751
COMBINATION AERODYNAMIC BRAKE AND THRUST
REVERSER FOR JET AIRCRAFT
Filed Dec. 1, 1959   3 Sheets-Sheet 2
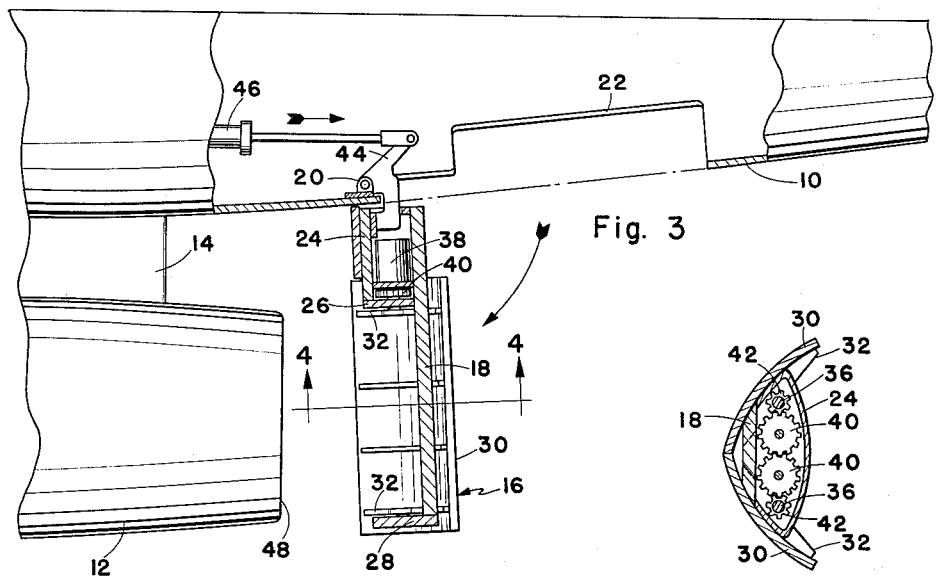
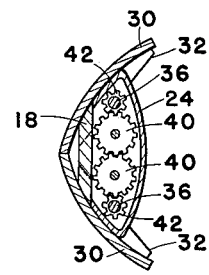
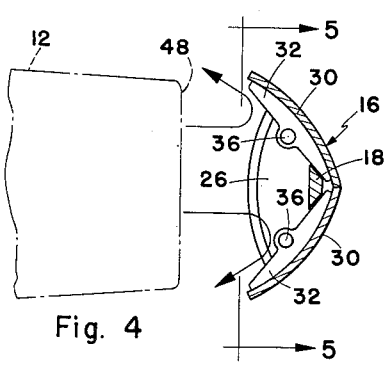
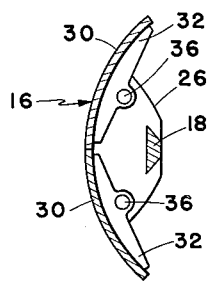
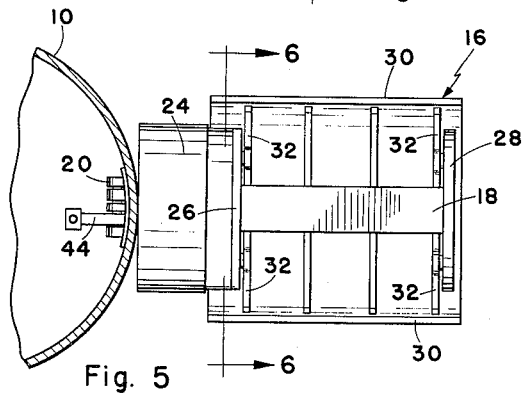
INVENTORS
JOHN F. SCOTT
JAMES L. KING
ZOLTAN PAZMANY
By *Knox & Knox*

INVENTORS
JOHN F. SCOTT
JAMES L. KING
ZOLTAN PAZMANY
By *Knox & Knox*

United States Patent Office 3,013,751
Patented Dec. 19, 1961

3,013,751
COMBINATION AERODYNAMIC BRAKE AND THRUST REVERSER FOR JET AIRCRAFT
John F. Scott, San Diego, James L. King, Del Mar, and Zoltan Pazmany, San Diego, Calif., assignors to Ryan Aeronautical Co., San Diego, Calif.
Filed Dec. 1, 1959, Ser. No. 856,513
7 Claims. (Cl. 244—110)

The present invention relates generally to aircraft propulsion and more particularly to a combination aerodynamic brake and thrust reverser for jet aircraft.

The primary object of this invention is to provide an aerodynamic brake and thrust reverser for use on aircraft having a jet engine or engines mounted outboard of the main airframe structure, the air brake assembly being contained in the main airframe and comprising an integral portion of the outer structure of the airframe when closed.

Another object of this invention is to provide aerodynamic brake means which is movable to a braking position angularly disposed to the direction of flight, to cause an increase in drag without interfering with the jet thrust.

Another object of this invention is to provide aerodynamic brake means movable to a second position obstructing the exhaust flow from the jet engine and having movable flow reversing baffles to reverse the exhaust flow.

A further object of this invention is to provide an aerodynamic brake and thrust reverser which is fail-safe in operation and is closed by the exhaust gas flow in the event of failure of the actuating mechanism.

Still another object of this invention is to provide an aerodynamic brake and thrust reverser which can be added to aircraft without any modification to the jet engines or their installation.

Finally, it is an object to provide an aerodynamic brake and thrust reverser of the aforementioned character which is simple and convenient to install and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 3 is an enlarged fragmentary sectional view taken on the line 3—3 of FIGURE 2;

FIGURE 4 is a sectional view taken on the line 4—4 of FIGURE 3;

FIGURE 5 is a view taken in the direction of line 5—5 of FIGURE 4;

FIGURE 6 is a sectional view taken on the line 6—6 of FIGURE 5;

FIGURE 7 is a sectional view similar to FIGURE 4, but showing the structure in braking position;

Similar characters of reference indicate similar or identical elements and portions throughout the specification and throughout the views of the drawing.

Figure 1:
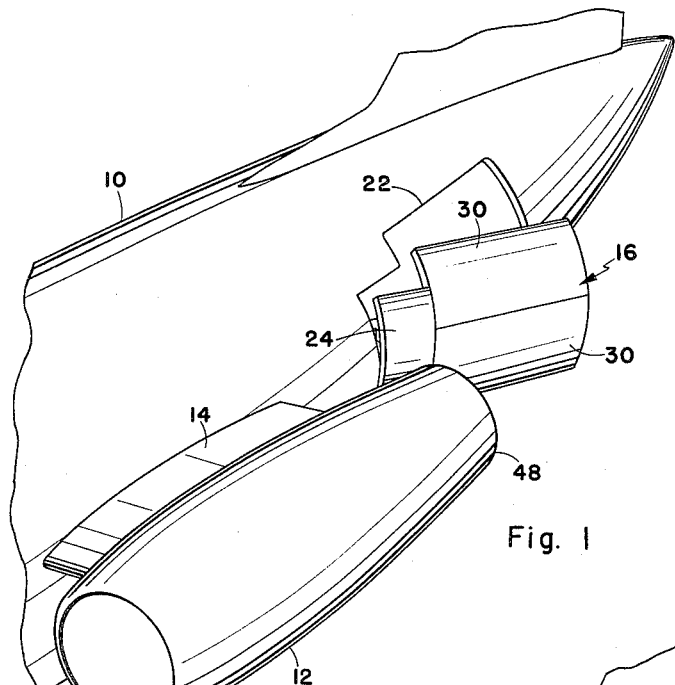
FIGURE 1 is a fragmentary perspective view of an aircraft showing the aerodynamic brake in braking position.

Referring now to FIGURES 1–7 of the drawings, the structure is illustrated as installed in the rear fuselage 10 of an aircraft, which is propelled by jet engines in self-contained engine pods 12 mounted outboard of the fuselage on pylons 14. One engine pod 12 is illustrated, although it should be understood that normally one engine would be mounted on each side of the fuselage for symmetrical thrust, the braking and thrust reversing structure being duplicated on opposite sides of the fuselage, one complete assembly being described in full hereinafter.

Rearwardly of the engine pod 12 is an air brake assembly 16, having an arm 18 which is pivotally attached at its forward end to the side of the rear fuselage 10 by means of a hinge 20, said rear fuselage having a large opening 22 into which said arm retracts. The forward end of the arm 18 is a rigid box portion 24, the rear end of which is closed by an inboard support plate 26, while at the rear end of the arm is an outboard support plate 28, similar and parallel to said inboard support plate. The support plates 26 and 28 extend above and below the arm 18 and mounted between the ends of said support plates are two baffles 30, pivotally mounted on vertically spaced axes generally parallel to said arm. The baffles 30 have reinforcing ribs 32 which are attached to the outer support plates 28 by hinge pins 34 and to the inner support plates 26 by hinge pins 36. When the arm 18 is retracted into the rear fuselage 10, the baffles 30 fill the opening 22 and conform to the contours of the fuselage, thus forming a portion of the skin structure.

Inside the box portion 24 is a motor 38 driving either one of a pair of intermeshing drive gears 40, said drive gears engaging driven gears 42 fixed to the inner hinge pins 36, as in FIGURE 6, so that the motor can rotate the baffles 30 about their pivotal axes. At the hinge 20, the arm 18 is provided with an extended actuating lever 44, to which is connected a jack 46, as illustrated in FIGURE 3. By actuation of the jack 46, the air brake assembly 16 can be swung outwardly from the rear fuselage 10 or retracted. The actuating mechanisms indicated for the air brake assembly 16 and for the baffles 30 are merely exemplary and it should be understood that many other types of mechanisms may be suitable.

In the closed or inoperative position, the air brake assembly 16 is a continuation of the fuselage skin and offers no drag or has any effect on aircraft performance. For aerodynamic drag or to decrease the speed of the aircraft, the jack 46 is actuated to extend the arm 18 outwardly at an angle to the longitudinal axis of the aircraft. In this position, illustrated in FIGURE 1, the baffles 30 present their convex faces to the slipstream and cause considerable drag, the position of the baffles also being indicated in FIGURE 7. However, the baffles 30 do not obstruct the exhaust gas flow from the nozzle portion 48 of the engine pod 12, the only effect on the exhaust gas flow being a slight outwardly deflection caused by the angularly deflected airflow over said baffles.

Figure 2:
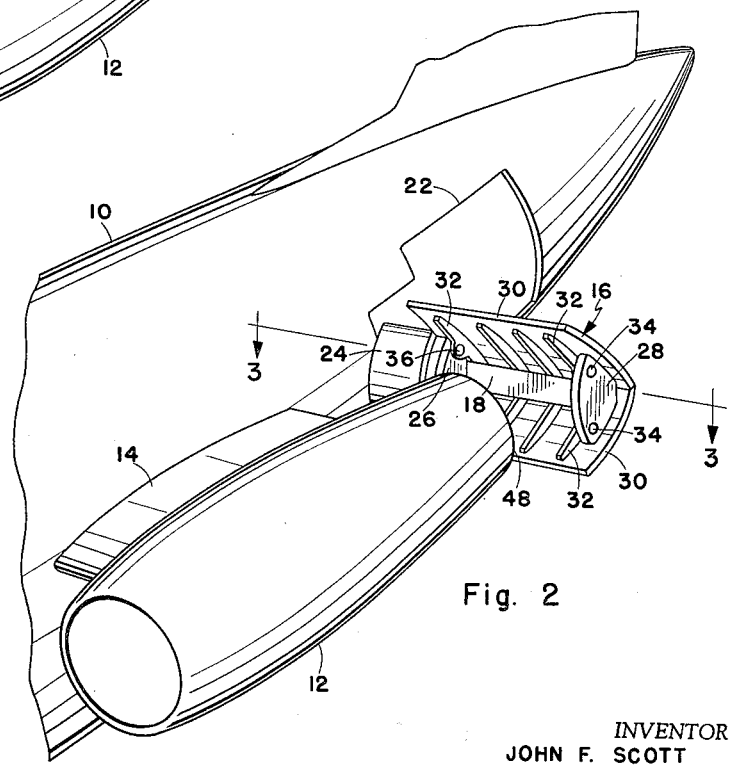
FIGURE 2 is a view similar to FIGURE 1, but showing the structure in reverse thrust position.

For thrust reversal, the arm 18 is extended further to a position substantially normal to the aircraft's longitudinal axis and, simultaneously, the motor 38 is actuated to rotate the baffles 30 relating to said arm until they present their convex faces to the airstream. In the fully extended position, the baffles 30 and arm 18 are disposed immediately downstream of the nozzle portion 48, as illustrated in FIGURES 2, 3 and 4, so that the exhaust gases are deflected and their flow substantially reversed, as indicated by the directional arrows in FIGURE 4. The support plates 26 and 28 contain the exhaust gases and reduce outward spillage from the ends of baffles 30.

The structure is, of course, duplicated on opposite sides of the fuselage and operated simultaneously for symmetrical drag or thrust reversal, although for certain uses, the air brake assemblies may be individually operable to obtain a degree of directional control. The structure as illustrated is applicable to the single engine pod 12 on each side but, by merely lengthening the air brake assembly 16, can be adapted to paired engines.

Figure 8:
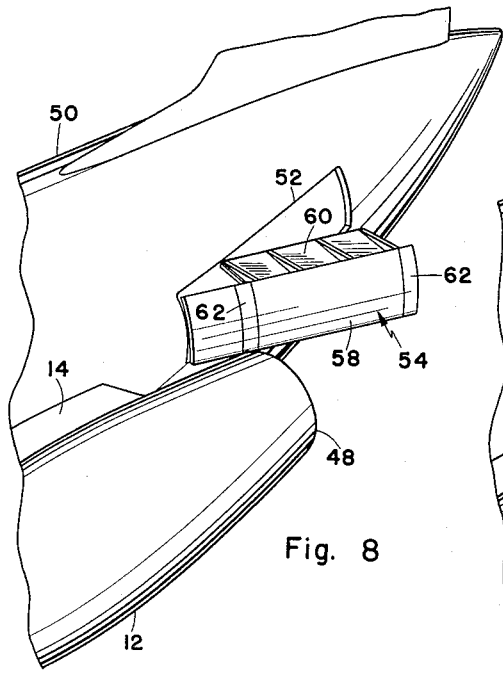
FIGURE 8 is a perspective view of a modified form of structure in braking position.
Figure 9:
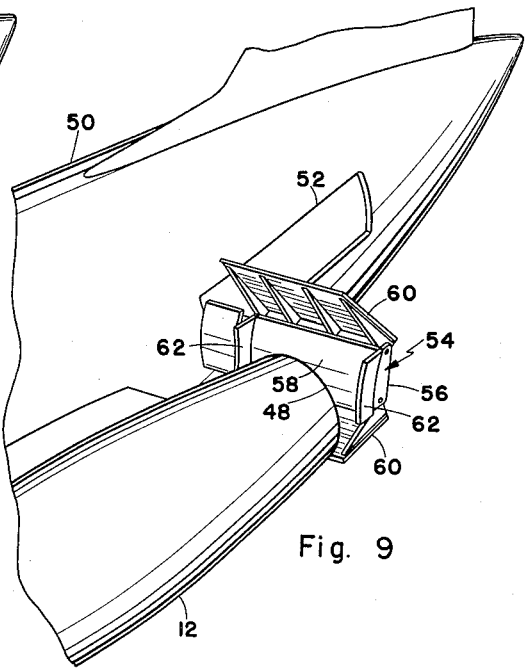
FIGURE 9 is a perspective view of the structure of FIGURE 8 is reverse thrust position.

Should an emergency arise while the mechanism is in reverse thrust position, the air brake assembly 16 can be retracted rapidly, assisted by the jet thrust, so that normal forward thrust is available. In the event of failure of the jack 46, the air brake assembly will be retracted by the thrust of the exhaust gases, thus providing desirable fail-safe characteristics.

Where sufficient space is available inside the airframe, the modified structure illustrated in FIGURES 8 and 9 may be used. In this arrangement, the rear fuselage 50 has an opening 52 in which is mounted an air brake assembly 54, having an arm 56 hinged to swing outwardly behind the engine pod 12. The actuating mechanism may be similar to that used for the arm 18. The outer face of the arm 56 is provided with a cover plate 58 conforming to the rear fuselage contours and fitting closely into the opening 52 when the assembly is closed. Pivotally attached to the arm 56 at the upper and lower edges thereof are two baffles 60, which normally extend generally horizontally behind said arm to pass through the opening 52 and in the retracted position, the baffles 60 extend inwardly of the rear fuselage 50.

In the aerodynamic braking position illustrated in FIGURE 8, the air brake assembly 54 is angularly extended, the face of the cover plate 58 providing the drag surface. In the thrust reversal position illustrated in FIGURE 9, the baffles 60 are rotated outwardly and angularly forwardly of the cover plate 58, after the arm 56 has been swung outwardly behind the nozzle portion 48 of engine pod 12, so that the exhaust gas flow is reversed. The mechanism for actuating the baffles 60 may be similar to that described for the baffles 30. To contain the exhaust gas flow more effectively, the cover plate 58 may be provided with a pair of hinged flaps 62 to extend forwardly when the baffles 60 are moved to reverse thrust position, a suitable simple mechanism for such an action being obvious to those skilled in the art.

Figure 10:
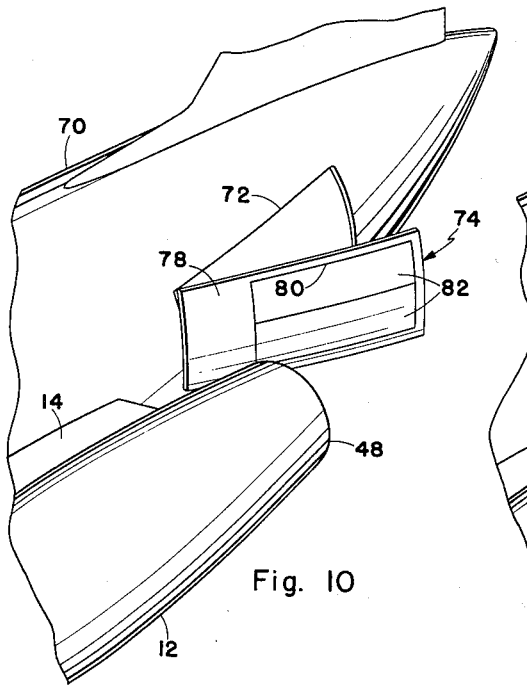
FIGURE 10 is a perspective view of a further modified form of structure in braking position.
Figure 11:
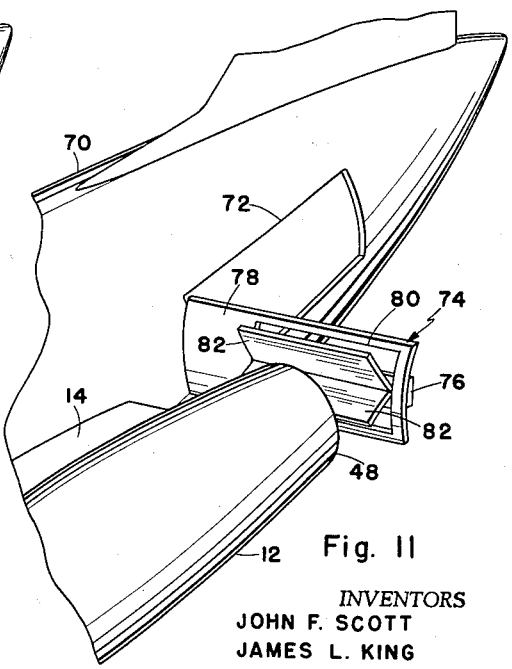
FIGURE 11 is a perspective view of the structure of FIGURE 10 in reverse thrust position.

A further modified form of the structure is illustrated in FIGURES 10 and 11, wherein the rear fuselage 70 has an opening 72 in which is mounted an air brake assembly 74, having an arm 76. The arm 76 is fitted with a cover plate 78 which fills the opening 72 as a continuation of the fuselage skin, said cover plate itself having a generally rectangular opening 80 in which are two baffles 82, comprising portions of the cover plate. The baffles 82 are hinged along a common axis substantially on the longitudinal center line of the arm 76 and swing forwardly to form a generally V-shaped channel, as indicated in the reverse thrust position in FIGURE 11. Again, the actuating mechanism may be as previously described.

In each form of the structure the air brake assembly comprises a portion of the fuselage structure, extendable to one position as an aerodynamic drag brake and to a second position, in which baffles hinged thereon are moved to a thrust reversal position immediately behind the jet engine. While the installation is shown and described for a rear fuselage mounted engine arrangement, it is also feasible to construct the air brake assembly as a portion of the underside structure of a wing, to swing downwardly behind an underslung pylon mounted engine.

By mounting the combination aerodynamic brake and thrust reverser structure in the main airframe, modifications to the engine installation are avoided. Thrust reverser mechanisms mounted on the engine itself must include the necessary actuating mechanism which, in the case of a pylon mounted engine, adds considerably to the weight to be supported and complicates stressing problems. Due to the aerodynamically clean design of most jet aircraft, spoilers or air brakes are usually needed for initial deceleration and require additional actuating mechanism. By combining the air brakes and thrust reversers and mounting the entire assembly on the main airframe structure away from the engine, stressing is simplified, actuating mechanisms are centralized and more space is available.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said air brake assembly fits in retracted position and in streamlined relationship with an adjacent portion of the airframe surface; said air brake assembly being hinged to said airframe structure; actuating means connected to said air brake assembly to swing the assembly selectively to a braking position angularly disposed to the direction of airflow and clear of said exhaust gas outlet, and to a reverse thrust position obstructing said exhaust gas outlet; said air brake assembly having baffles shiftably mounted thereon; and actuating means connected to said baffles to move the baffles to angularly outwardly and forwardly disposed positions on opposite sides of said exhaust gas outlet, whereby the exhaust gases are deflected generally forwardly.

2. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said airbrake assembly fits in retracted position and in streamlined relationship with an adjacent portion of the airframe surface; said air brake assembly having a rigid arm hinged at its forward end to said airframe structure to swing outwardly therefrom; actuating means connected to said arm to swing the air brake assembly selectively to a braking position angularly disposed to the direction of airflow and clear of said exhaust gas outlet, and to a reverse thrust position immediately rearward of said exhaust gas outlet; baffles pivotally mounted on said arm; and actuating means connected to said baffles to swing the baffles to angularly outwardly and forwardly disposed positions on opposite sides of said exhaust gas outlet, whereby the exhaust gases are deflected generally forwardly.

3. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said air brake assembly fits in retracted position and in streamlined relationship with an adjacent portion of the airframe surface; said air brake assembly having a rigid arm hinged at its forward end to said airframe structure to swing outwardly therefrom; actuating means connected to said arm to swing the air brake assembly selectively to a braking position angularly disposed to the direction of airflow, and to reverse thrust position immediately rearward of said exhaust gas outlet; baffles pivotally mounted on said arm; said baffles constituting a continuation of the outer surface of said airframe structure when said air brake assembly is disposed in said opening; and actuating means connected to said baffles to swing the baffles to angularly outwardly and forwardly disposed positions on opposite sides of said exhaust gas outlet, whereby the exhaust gases are deflected generally forwardly.

4. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said air brake assembly fits in retracted position and in streamlined relationship with an adjacent portion of the airframe surface; said air brake assembly having a rigid arm hinged at its forward end to said airframe structure to swing outwardly therefrom; actuating means connected to said arm to swing the air brake assembly selectively to a braking position angularly disposed to the direction of airflow and clear of said exhaust gas outlet, and to a reverse thrust position immediately rearward of said exhaust gas outlet; a pair of baffles pivotally attached to said arm on axes substantially parallel to the longitudinal axis of the arm; and actuating means connected to said baffles to swing the baffles to angularly outwardly and forwardly disposed positions above and below the axis of said exhaust gas outlet, whereby the exhaust gases are deflected generally forwardly.

5. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said air brake assembly fits in retracted position and in streamlined relationship with an adjacent portion of the airframe surface; said air brake assembly having a rigid arm hinged at its forward end to said airframe structure to swing outwardly therefrom; actuating means connected to said arm to swing the air brake assembly selectively to a braking position angularly disposed to the direction of airflow, and to a reverse thrust position immediately rearward of said exhaust gas outlet; said arm having support plates adjacent opposite ends thereof and extending generally normal thereto; a pair of baffles pivotally mounted on said support plates on spaced axes above and below said arm and substantially parallel to the longitudinal axis thereof; said baffles constituting a continuation of the outer surface of said airframe structure when said air brake assembly is disposed in said opening; and actuating means connected to said baffles to swing the baffles to angularly outwardly and forwardly disposed positions on opposite sides of said exhaust gas outlet, whereby the exhaust gases are deflected generally forwardly.

6. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said air brake assembly fits in retracted position and in streamlined relationship with an adjacent portion of the airframe surface; said air brake assembly having a rigid arm hinged at its forward end to said airframe structure to swing outwardly therefrom; actuating means connected to said arm to swing the air brake assembly selectively to a braking position angularly disposed to the direction of airflow, and to a reverse thrust position immediately rearward of said exhaust gas outlet; a pair of baffles pivotally mounted on axes substantially parallel to the longitudinal axis of said arm and spaced above and below the arm; said baffles extending inwardly into said airframe structure when said air brake assembly is disposed in said opening; and actuating means connected to said baffles to swing the baffles outwardly and to angularly forwardly disposed positions on opposite sides of said arm in said reverse thrust position, whereby the exhaust gases are deflected generally forwardly.

7. In combination, an airframe structure, a jet engine mounted thereon and having a rear exhaust gas outlet; and a combined aerodynamic brake and thrust reverser comprising an air brake assembly in the airframe structure immediately rearwardly of said jet engine; said airframe structure having an opening into which said air brake assembly fits in retracted position and in streamlined relationship with an adjacent portion of the airframe surface; said air brake assembly having a rigid arm hinged at its forward end to said airframe structure to swing outwardly therefrom; actuating means connected to said arm to swing the air brake assembly selectively to a braking position angularly disposed to the direction of airflow, and to reverse thrust position immediately rearward of said exhaust gas outlet; said arm having a cover plate fixed thereon and constituting a continuation of the outer surface of said airframe structure when said air brake assembly is disposed in said opening; a pair of baffles integral with said cover plate and pivotally attached to said arm on axes substantially parallel to the longitudinal axis of the arm; and actuating means connected to said baffles to swing the baffles to angularly outwardly and forwardly disposed positions on opposite sides of said exhaust gas outlet, whereby the exhaust gases are deflected generally forwardly.

References Cited in the file of this patent

UNITED STATES PATENTS

| | | |
|---|---|---|
| 2,758,805 | Graham | Aug. 14, 1956 |
| 2,866,610 | Taylor | Dec. 30, 1958 |